Feb. 8, 1927. 1,616,729
L. W. WITRY
DETACHABLE RIM FOR TRACTOR WHEELS
Filed July 19, 1920
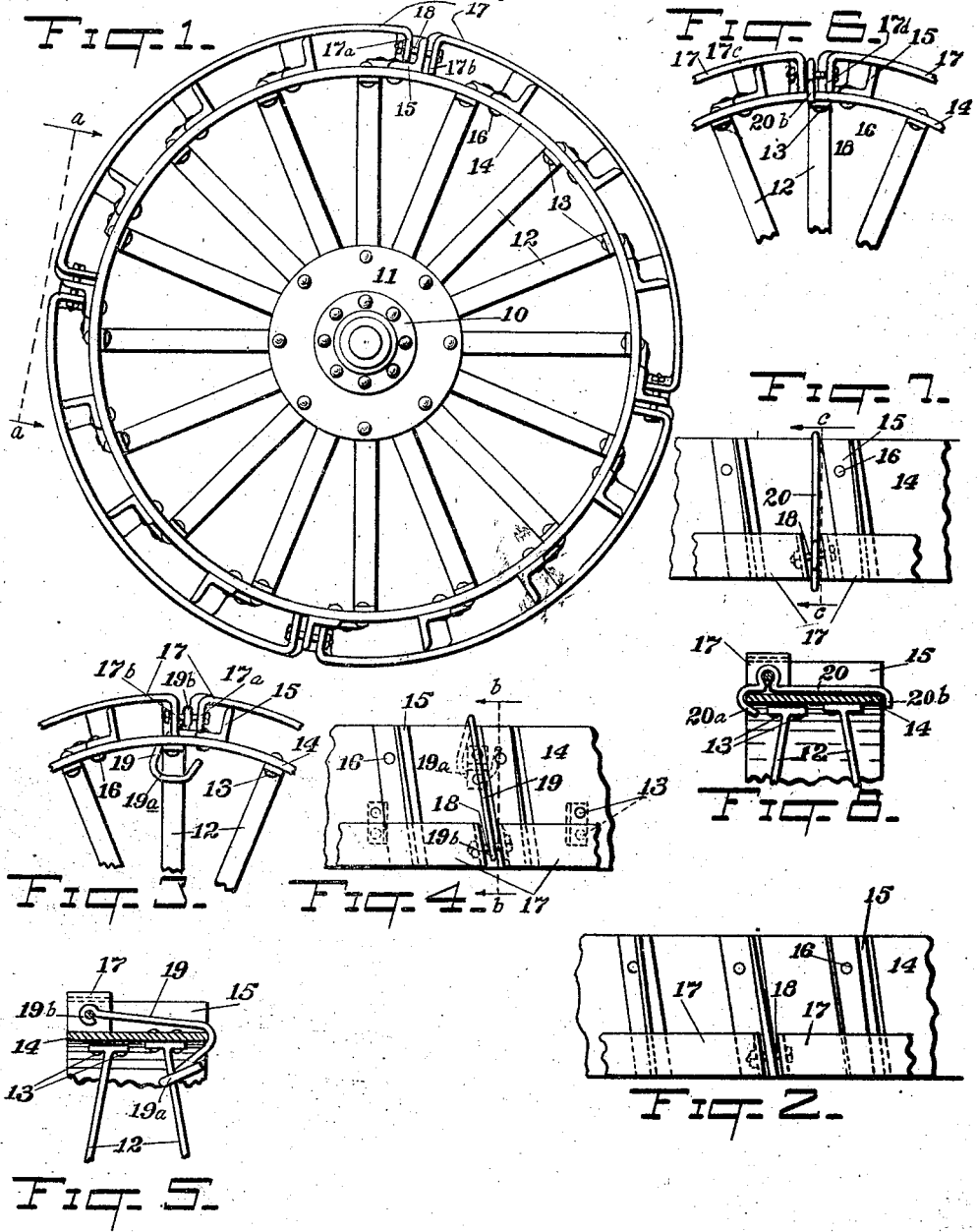

Patented Feb. 8, 1927.

1,616,729

UNITED STATES PATENT OFFICE.

LOUIS W. WITRY, OF WATERLOO, IOWA, ASSIGNOR TO JOHN DEERE TRACTOR COMPANY, OF WATERLOO, IOWA, A CORPORATION OF IOWA.

DETACHABLE RIM FOR TRACTOR WHEELS.

Application filed July 19, 1920. Serial No. 397,446.

This invention relates to a quick attachable or detachable tire rim for tractor wheels having lugs or grousers attached thereon.

It has been found necessary in using tractors in the field to equip the traction wheels with projections commonly called lugs or grousers. It is often necessary to run the tractor on the highways and these lugs are very destructive to the surface of the road, so much so, in many localities it is forbidden to operate tractors on the highways unless the wheels have a smooth rim. With the usual type of grouser or lug it is a long arduous task to remove them to permit the tractor being operated on the highway and to again replace them when it is desired to operate the tractor in the fields. To lessen the labor and the time element involved in this changing operation various types of quick detachable lugs have been designed but these have proven more or less unsatisfactory for the following reasons:

The usual lugs are quite heavy, the equipment for a tractor weighing several hundred pounds, thus making them burdensome to handle everytime it is desired to go on the highway from the field or vice versa; they are very bulky making them inconvenient to handle when detached from the tire rim; and also it is necessary to provide some container in which to carry them when going from place to place on the highway. Even where it is not forbidden to operate tractors with lug equipped wheels on the highways, it is very uncomfortable for the operator and also injurious to the tractor to do so on account of the severe jolts and vibrations caused by the space between the lugs.

It is an object of this invention to provide a comparatively light, easily handled, smooth surfaced rim that is quickly attached to or detached from the lug equipped tractor wheel.

Referring to the accompanying drawings in which like numerals indicate identical parts.

Figure 1 is a side view of a tractor wheel with the improved rim attached to the wheel in the preferred manner.

Figure 2 is a plan view on line a—a of Figure 1.

Figure 3 is a side view of a portion of the wheel showing a modified form of the rim attaching means.

Figure 4 is a plan view of Figure 3.

Figure 5 is a transverse section on line b—b of Figure 4.

Figure 6 is a side view of a portion of the wheel showing another modified form of the rim attaching means.

Figure 7 is a plan view of Figure 6; and

Figure 8 is a transverse section on line c—c of Figure 7.

The tractor wheel may be of any preferred type and construction. In the wheel illustrated 10 indicates the wheel hub having a flange 11 to which are attached at their inner ends in any suitable manner, a series of spokes 12. The spokes 12 are bolted or riveted at their outer ends, by means of bolts or rivets 13, to the tire 14. 15 are lugs or grousers, in the instance illustrated made from angle iron, one side of the angle forming the base portion and being attached to the tire 14 by means of rivets or bolts 16, the other side of the angle forming a projection from the tire 14 thereby insuring the grip of the wheel on the ground. As will be seen by referring to the drawings, the lugs 15 are spaced apart around the periphery of the tire 14. 17 represents the quick attachable and detachable rim, composed preferably of four arcuate sections as shown in Figure 1. The rim 17 is made of flat metal of sufficient width to support the weight of the tractor when used on the road, and bent to conform to the radius of the outside edge of the lugs 15, the diameter of the rim as a whole being such that it may be applied to the wheel over the lugs and then by drawing its separated ends together may be reduced in circumference so that it will be clamped or bound tightly on said lugs. The various sections of the rim 17 are attached to the wheel in the same manner so it is deemed sufficient to describe the method of attaching two of the sections. In the preferred method of attaching the rim 17 as shown in Figures 1 and 2 a suitable hole is punched or drilled in one of the lugs 15. The ends of the sections of the rim 17 are bent at approximately right angles to the face of the rim as shown at $17^a$ and $17^b$, to form inturned flanges at the separated ends of the rim which rest upon and are supported by the periphery of the wheel. In the construction shown in Figs. 1 to 3 these flanges 17ª and 17ᵇ are of unequal length, the inner margin of the flange 17ª resting on the base section of the lug 15, and the inner margin of the flange 17ᵇ resting directly on the tire 14, so that both the separated ends are firmly supported by the peripheral portion of the wheel against inward movement. The bent over portions or flanges 17ª and 17ᵇ are twisted to conform to whatever angle the lugs 15 are placed on the tire 14. Suitable holes are drilled or punched in the bent over portions 17ª and 17ᵇ in position to register with the hole in the lug 15 when the rim 17 is in place. A suitable bolt 18 is inserted through the holes in the bent over portions of the sections of the rim 17 and through the holes in the lug 15 and as the nut on the bolt 18 is tightened it will draw the separated ends of the rim together, thereby reducing its circumference and drawing it down tightly and securely on the edges of the lugs 15. The bolt 18 is located between the side margins of the wheel so that it is protected and is not apt to be struck, with consequent disarrangement of the rim should the road be rough or contain obstructions, or in passing through gates. The rim is prevented from lateral movement relative to the lugs 15 by reason of the bolts 18 being inserted through the lugs 15 and the bent over portions of the rim 17. It will be seen from the foregoing description that the separated ends of the rim, or rim sections, are drawn together to reduce the circumference of the rim as a whole and bind it on the wheel by means which also serves to hold the rim against lateral movement on the lugs by reason of its being connected with the wheel in such manner, as by extending the bolt 18 through one of the lugs 15, that it is held against such lateral movement. It will also be noted that such means is connected with the wheel in addition to being connected with the rim, and at a point between the separated ends of the rim, so that such separated ends are held down firmly in contact with the periphery of the wheel as well as being held against lateral distortion.

While the form of attaching means shown in Figs. 1 and 2 is the one which I prefer because of its simplicity, my invention also includes various other arrangements by which the same principle may be applied, and in Figs. 3 to 8 of the accompanying drawings I have shown several of such modifications in which instead of passing the bolt 18 through one of the lugs, as shown in Figs. 1 and 2, for connecting it with the wheel to hold the rim against lateral movement other expedients for that purpose are employed.

Figures 3, 4 and 5 illustrate a method of connecting the bolt 18 with the wheel to hold it and the rim against lateral movement by means of a hook 19. In attaching the rim to the wheel by this method, the bent over portions 17ª and 17ᵇ are placed between the lugs 15, and if desired the end portions 17ª and 17ᵇ may be of equal length and so that both rest directly on the tire 14. The hook 19 is bent intermediate its end to engage one edge of the tire 14, on one end having a hook portion 19ª, engaging one of the spokes 12, and on the other end having an eye 19ᵇ to receive, when in position, the bolt 18. The hook 19 by engaging the edge of the tire 14 and one of the spokes 12 will serve to prevent lateral movement of the rim 17 relative to the lugs 15.

Figures 6, 7 and 8 illustrate another arrangement for connecting the bolt 18 with the wheel to hold it against lateral movement. 20 is a hook with one end 20ª bent to engage the tire 14 on the underside as plainly shown in Figure 8. The other end of the hook 20 is bent as at 20ᵇ to engage the opposite edge of the tire 14. Intermediate the ends of the hook 20 an eye is formed suitable for receiving the bolt 18. In using this method the bent over portions of the rim 17 are of equal length as shown at 17ᶜ and 17ᵈ and both ends rest on the surface of the tire 14. It will thus be seen that the hook 20 by engaging both edges of the tire 14 and the bolt 18 will prevent lateral movement of the bolt 18 and rim 17 relative to the lugs 15.

When the rim 17 is in place on the lugs 15, it will be seen a smooth surface is presented to the roadway, preventing the roadway from being injured by the sharp edges of the lugs 15, and also the operator and tractor will not be subjected to the severe jolts and vibrations that would be received if the lugs were allowed to come into contact with the hard surface of the road.

While I prefer to make the rim in four sections, as above stated, because it is desirable to make the rim of comparatively thick material so that it will properly withstand the usage to which it is subjected without wearing out too rapidly, and where such material is comparatively thick it is apt to be so stiff that to draw the rim properly down upon the lugs provision should be made for applying the tensile strain at several points around the rim, my invention is not limited to making the rim of any particular number of sections, as my improved means for attaching it to the wheel may be employed regardless of the number of points at which separated ends to be drawn together are provided.

What I claim is—

1. The combination with a traction wheel having lugs on its periphery, of a rim adapted to be mounted on the wheel over such lugs, said rim comprising a plurality of sections having separated ends, and means operable to draw such separated ends together to reduce the circumference of the rim and bind the same on said lugs, and means connected with said drawing means and with the wheel to hold the rim against lateral movement on said lugs.

2. The combination with a traction wheel having lugs on its periphery, of a rim adapted to be mounted on the wheel over such lugs, said rim having separated ends, and a bolt connecting said separated ends and operable to draw them together to reduce the circumference of the rim and bind the same on said lugs, and means connected with said bolt and with the wheel to hold the rim against lateral movement on said lugs.

3. The combination with a traction wheel having lugs on its periphery, of a rim adapted to be mounted on the wheel over such lugs, said rim comprising a plurality of sections having separated ends provided with inturned flanges supported by the periphery of the wheel, and means connected with said flanges between the side margins of the wheel and operable to draw said separated ends together to reduce the circumference of the rim and bind the same on said lugs.

LOUIS W. WITRY.